United States Patent
Zhang et al.

(10) Patent No.: US 11,295,765 B1
(45) Date of Patent: Apr. 5, 2022

(54) DATA STORAGE DEVICE CALIBRATING FINE ACTUATOR BY RAMPING DISTURBANCE TO ATTENUATE SERVO TRANSIENT

(71) Applicant: Western Digital Technologies, Inc., San Jose, CA (US)

(72) Inventors: Kun Zhang, Irvine, CA (US); Shravankumar Girish Bhat, Broomfield, CO (US); Shrey Khanna, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/358,810

(22) Filed: Jun. 25, 2021

(51) Int. Cl.
*G11B 5/55* (2006.01)
*G11B 5/012* (2006.01)
*G11B 21/10* (2006.01)

(52) U.S. Cl.
CPC ............ *G11B 5/012* (2013.01); *G11B 21/106* (2013.01)

(58) Field of Classification Search
CPC ..... G11B 5/5547; G11B 5/54; G11B 5/59633; G11B 5/59638; G11B 5/59627; G11B 5/5552; G11B 5/5534; G11B 5/5556

USPC ... 360/77.04, 78.09, 75, 77.08, 78.05, 78.14
See application file for complete search history.

(56) References Cited

U.S. PATENT DOCUMENTS

| | | |
|---|---|---|
| 6,546,296 B1 | 4/2003 | Hara |
| 7,423,837 B2 | 9/2008 | Hutsell |
| 7,474,496 B1 | 1/2009 | Sun et al. |
| 8,611,040 B1 | 12/2013 | Xi et al. |
| 8,724,254 B1 | 5/2014 | Tang et al. |
| 8,780,489 B1 * | 7/2014 | Gayaka .............. G11B 5/59627 360/78.05 |

* cited by examiner

*Primary Examiner* — Nabil Z Hindi
(74) *Attorney, Agent, or Firm* — Patterson & Sheridan, LLP; Steven H. Versteeg

(57) ABSTRACT

A data storage device is disclosed comprising a first plurality of heads actuated over a first subset of disk surfaces by a first servo control loop comprising a first coarse actuator and a first fine actuator, and a second plurality of heads actuated over a second subset of the disk surfaces by a second servo control loop comprising a second coarse actuator and a second fine actuator. A plurality of access commands are received, wherein each access command is associated with one of the heads. While executing a first access command using the first servo control loop, a disturbance is ramped while injecting the disturbance into the second servo control loop, and the second fine actuator is calibrated based on the disturbance.

20 Claims, 3 Drawing Sheets

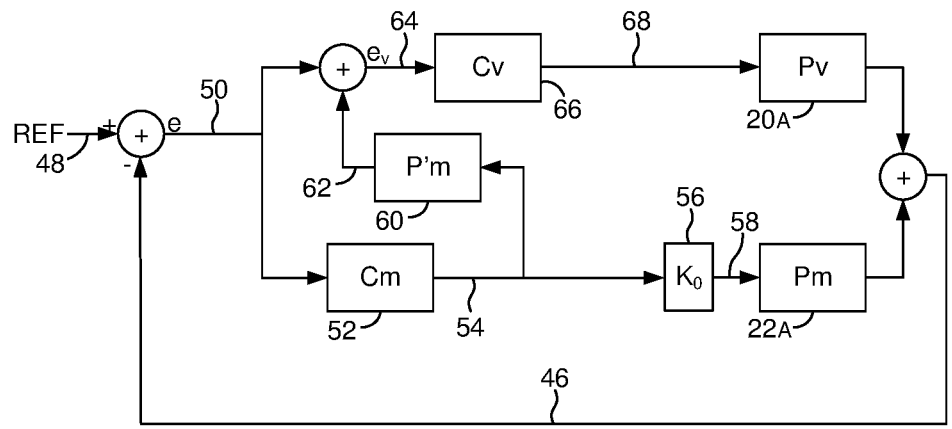
FIG. 3
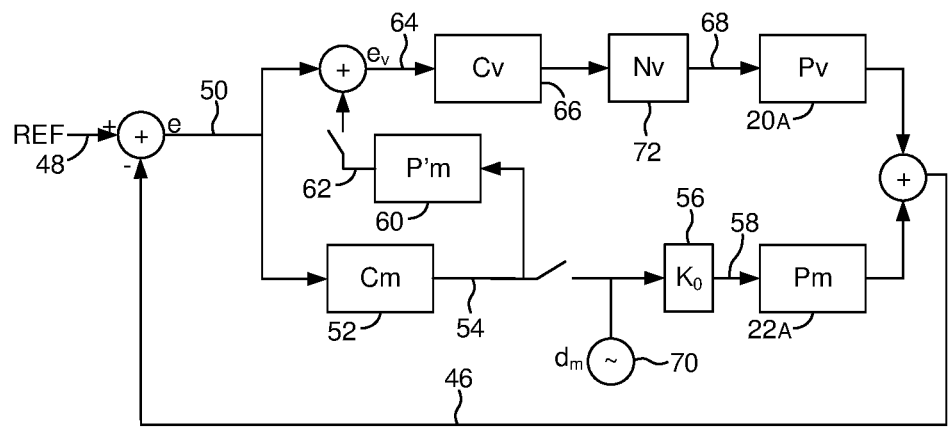
FIG. 4A
$d_m =$ ⟿⟿⟿
FIG. 4B
$d_m =$ ⟿⟿⟿
FIG. 4C

DATA STORAGE DEVICE CALIBRATING FINE ACTUATOR BY RAMPING DISTURBANCE TO ATTENUATE SERVO TRANSIENT

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 3 shows a servo control loop comprising a coarse actuator (e.g., VCM) and a fine actuator (e.g., a microactuator or milli-actuator).

FIG. 4A shows an embodiment wherein a disturbance injected into the second servo control loop to calibrate the fine actuator is ramped in order to attenuate a transient while executing an access command using the first servo control loop.

FIG. 4B shows an embodiment wherein the ramped disturbance consists of a ramped sinusoid.

FIG. 4C shows an embodiment wherein when the first servo control loop is executing a write command, the slope of the ramped disturbance injected into the second servo control loop is decreased to further attenuate the transient affecting the first servo control loop.

DETAILED DESCRIPTION

Figure 2A:
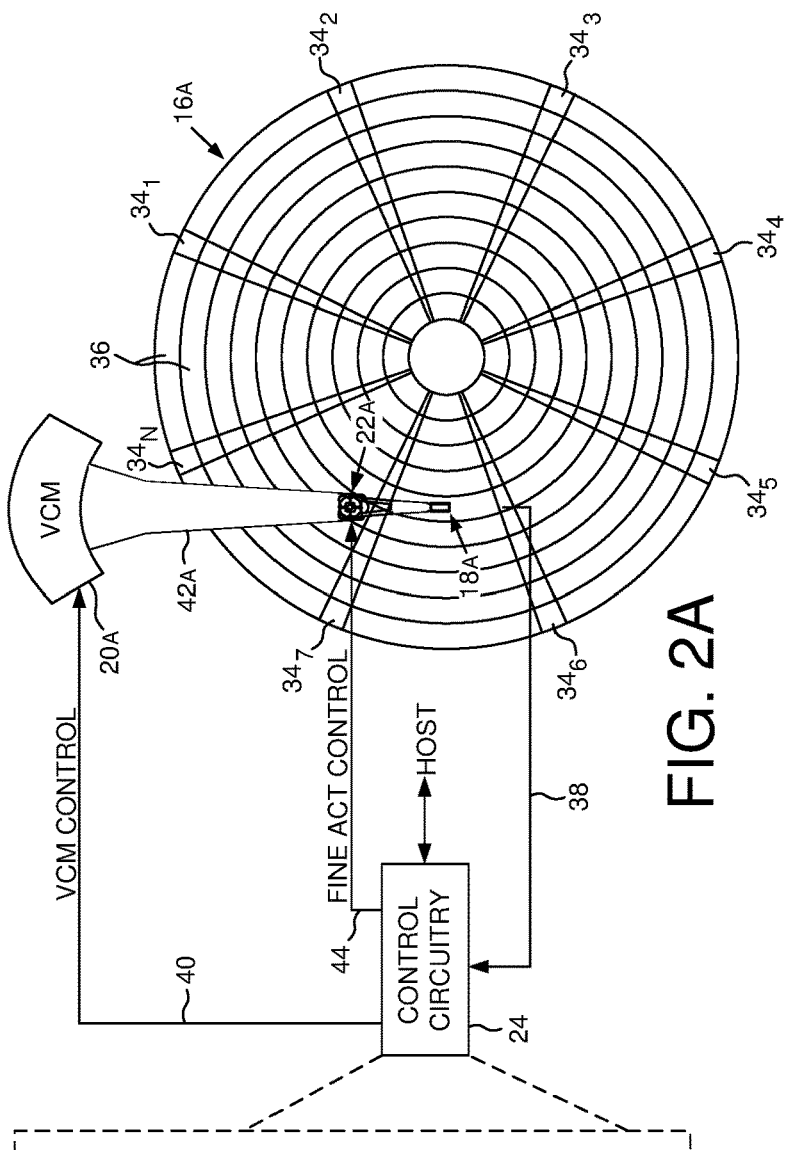
FIG. 2A shows a data storage device in the form of a disk drive according to an embodiment comprising a head actuated over a disk surface.
Figure 2B:
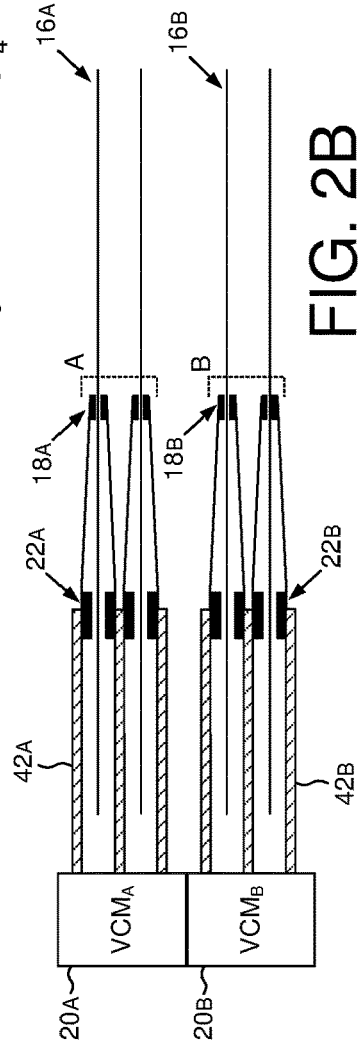
FIG. 2B shows an embodiment wherein the disk drive comprises a split actuator comprising a first VCM actuating a first subset of actuator arms and a second VCM actuating a second subset of actuator arms about a common pivot.
Figure 2C:
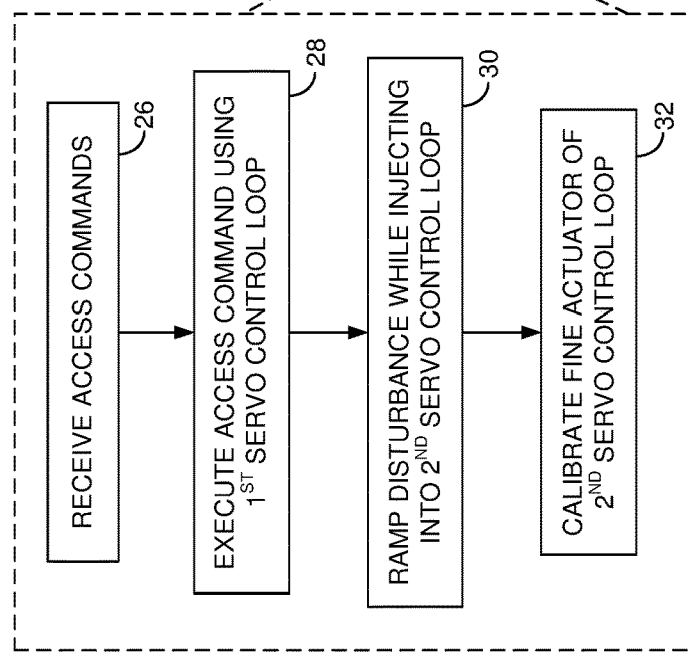
FIG. 2C is a flow diagram according to an embodiment wherein while executing an access command using a first servo control loop comprising the first VCM, a ramped disturbance is injected into a second servo control loop comprising the second VCM in order to calibrate a fine actuator of the second servo control loop.

FIGS. 2A and 2B show a data storage device in the form of a disk drive according to an embodiment comprising a plurality of disk surfaces (e.g., 16A and 16B). A first plurality of heads (e.g., 18A) are actuated over a first subset of the disk surfaces (e.g., 16A) by a first servo control loop comprising a first coarse actuator (e.g., VCM 20A) and a first fine actuator (e.g., fine actuator 22A). A second plurality of heads (e.g., 18B) are actuated over a second subset of the disk surfaces (e.g., 16B) by a second servo control loop comprising a second coarse actuator (e.g., VCM 20B) and a second fine actuator (e.g., fine actuator 22B). The disk drive further comprises control circuitry 24 configured to execute the flow diagram of FIG. 2C, wherein a plurality of access commands are received (block 26) each associated with one of the heads. While executing a first access command using the first servo control loop (block 28), a disturbance is ramped while injecting the disturbance into the second servo control loop (block 30) and the second fine actuator is calibrated based on the disturbance (block 32).

Figure 1:
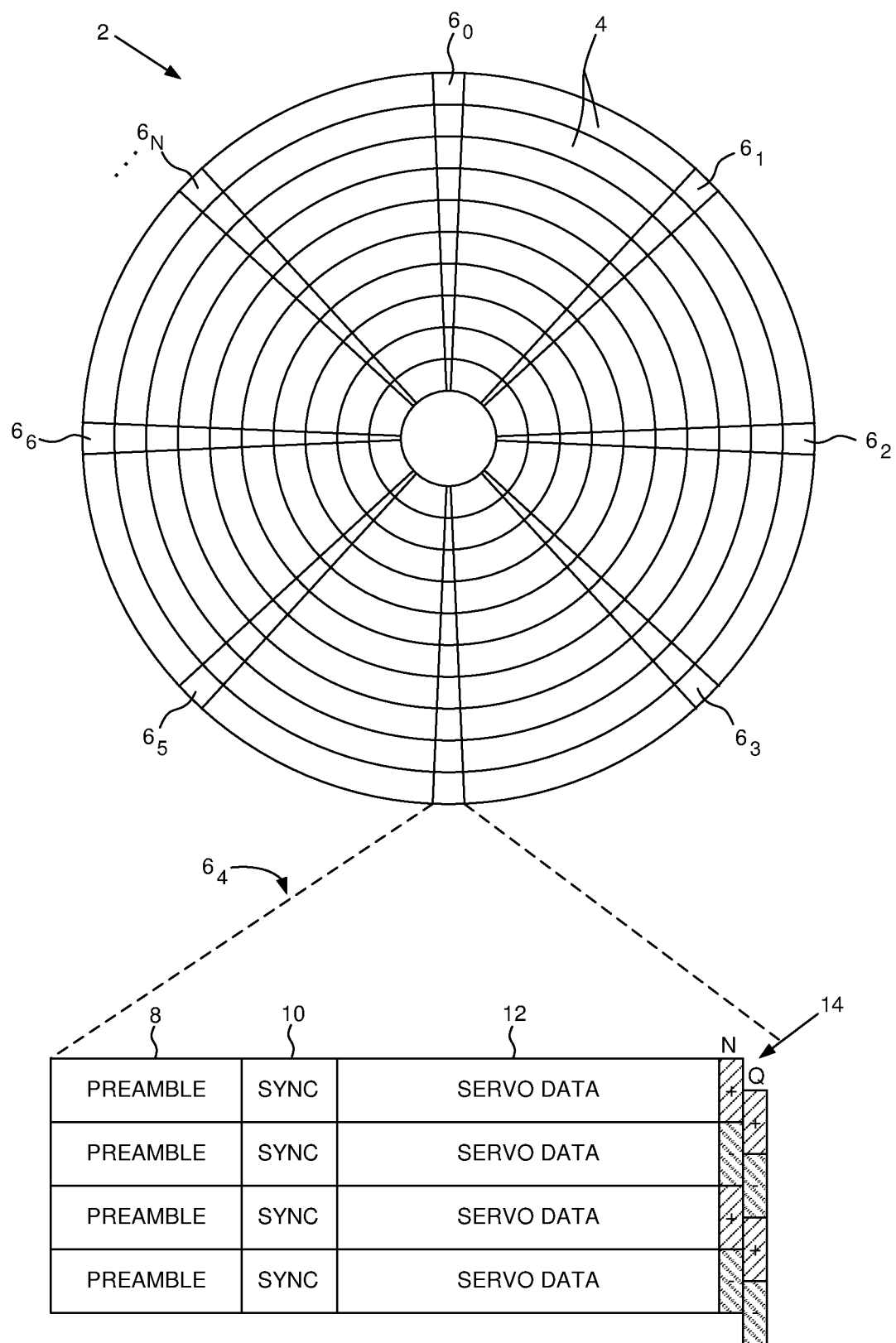
FIG. 1 shows a prior art disk format comprising a plurality of servo tracks defined by servo sectors.

In the embodiment of FIG. 2A, each disk surface (e.g., 16A) comprises a plurality of servo sectors $34_1$-$34_N$ that define a plurality of servo tracks 36, wherein data tracks are defined relative to the servo tracks at the same or different radial density. The control circuitry 24 processes a read signal 38 emanating from the head to demodulate the servo sectors and generate a position error signal (PES) representing an error between the actual position of the head and a target position relative to a target track. A servo control system in the control circuitry 24 filters the PES using a suitable compensation filter to generate a control signal 40 applied to a coarse actuator (e.g., VCM 20A) which rotates an actuator arm (e.g., 42A) about a pivot in order to actuate the corresponding heads radially over the disk surfaces in a direction that reduces the PES. The servo control system also generates a control signal 44 applied to a fine actuator, such as a piezoelectric (PZT) actuator, configured to actuate a suspension relative to the actuator arm as shown in FIG. 2A, and/or a fine actuator configured to actuate the head relative to the suspension. The servo sectors $34_1$-$34_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

In the embodiment of FIG. 2B, the first and second VCMs 20A and 20B rotate the respective set of actuator arms (e.g., 42A and 42B) about a common pivot in what has been referred to as a split actuator design. In another embodiment, a first and second VCM may be configured to actuate a respective set of actuator arms about a separate pivot, for example, mounted at different circumferential locations about the disks. Other embodiments may employ more than two actuators, for example, an embodiment employing more than two actuators actuated about a common pivot or an embodiment employing multiple split actuators mounted at different circumferential locations about the disks.

FIG. 3 shows an example first servo control system for controlling the first coarse actuator (e.g., VCM 20A) and first fine actuator (e.g., 22A) for the first plurality of disk surfaces (e.g., 16A), wherein a similar second servo control system controls the second coarse actuator (e.g., VCM 20B) and second fine actuator (e.g., 22B) for the second plurality of disk surfaces (e.g., 16B). An estimated position 46 (generated from reading the servo sectors $34_1$-$34_N$) is subtracted from a reference position 48 to generate the position error signal (PES) 50 representing an error between the actual position of the head and a target position relative to a target track. The position error signal (PES) 50 is processed by a fine actuator compensator 52 to generate a control signal 54 amplified by gain block 56 to generate a control signal 58 applied to the fine actuator 22A. A model of the fine actuator 60 processes the control signal 54 to generate a control signal 62 that is subtracted from the PES 50 to generate a VCM error signal 64 (i.e., the estimated effect of the control signal 54 on the fine actuator 22A is subtracted from the PES 50 to generate the VCM error signal 64). The VCM error signal 64 is processed by a VCM compensator 66 to generate a control signal 68 applied to the voice coil motor (VCM) 20A which rotates the first subset of actuator arms (e.g., 42A) about the pivot.

In one embodiment, a nominal frequency response of the fine actuator 22A is determined (theoretically or empirically) and used to configure the model of the fine actuator 60. However, the gain of the fine actuator 22A may deviate from the nominal value over time due, for example, to changes in environmental conditions (e.g., temperature) or general degradation of the fine actuator 22A. Accordingly, in one embodiment the gain of the fine actuator 22A is estimated and in one embodiment adjusted (by adjusting gain block 56), and/or the gain of the model of the fine actuator 60 is adjusted, in order to maintain a target frequency response and overall performance of the servo control loop. The gain block 56 may be implemented in any suitable manner, such as an adjustable analog amplifier or a digital amplifier followed by a digital-to-analog converter.

FIG. 4A shows an embodiment wherein the gain of the fine actuator 22A may be calibrated by injecting a disturbance 70 into the servo control loop, for example, by decoupling the fine actuator 22A from the fine actuator compensator 52 and injecting the disturbance 70 into the gain block 56 as shown in FIG. 4A. Any suitable disturbance 70 may be injected into the servo control loop in order to calibrate the fine actuator 22A, and in an embodiment shown in FIG. 4B, the disturbance 70 consists of a sinusoid generated at a predetermined frequency. When calibrating the fine actuator 22A, a notch filter 72 filters the output of the VCM compensator 66 to cancel the contribution of the VCM 20A to the PES 50. The transfer function of the servo control loop may then be represented as:

$$\left|\frac{PES(j\omega)}{D_m(j\omega)}\right| = \left|\frac{1}{1 + C_V N_V P_V(j\omega)} P_m(j\omega)\right|$$

In one embodiment, the depth of the notch filter 72 is adjusted until $1+C_V N_V P_V(j\omega)$ is close to unity so that:

$$|P_m(j\omega)| = \left|\frac{PES(j\omega)}{D_m(j\omega)}\right|$$

That is, the gain of the fine actuator 22A may be measured as the amplitude of the PES 50 divided by the amplitude of the disturbance 70 (in the frequency domain). In one embodiment the gain block 56 may be adjusted until the measured gain of the fine actuator 22A (e.g., as measured using the above equation) achieves a target value.

In one embodiment, it may be desirable to calibrate the fine actuator of one of the servo control loops (e.g., the second servo control loop) while the other servo control loop (e.g., first servo control loop) is active executing an access command. For example, in one embodiment the fine actuator of each servo control loop may be periodically calibrated to compensate for changes in environmental conditions. In order to maintain a target performance (e.g., target throughput), one of the servo control loops may remain active executing access commands while calibrating the fine actuator of the other control loop, and vice versa. In one embodiment, the control circuitry 24 may select which servo control loop to calibrate based on the work load of each servo control loop, such as calibrating the servo control loop that has no or few access commands to execute, or calibrating the servo control loop as part of a sort algorithm that executes the queued access commands in an order that optimizes performance. That is the sort algorithm may take into account the need to calibrate one of the servo control loops and effectively schedule the calibration procedure at a time that optimizes performance in relation to the pending access commands. In another example, the control circuitry 24 may calibrate each servo control loop serially during a start-up operation of the data storage device, wherein when finished calibrating the first servo control loop the second servo control loop may be calibrated while the first servo control loop begins executing queued access commands.

In one embodiment when executing an access command with the first servo control loop, injecting the disturbance 70 into the second servo control loop may cause an undesirable transient in the first servo control loop. If the transient is too large, it may disrupt execution of the access command by the first servo control loop, such as causing a read error during a read operation, or causing a write operation to be aborted, due to the head deviating excessively from the target data track. Accordingly in one embodiment, in order to attenuate a transient induced in the active servo control loop the disturbance 70 may be ramped from a low amplitude to a nominal amplitude and from the nominal amplitude to a low amplitude such as shown in FIG. 4B. In this manner a coupling disturbance between the servo control loops is attenuated, thereby maintaining adequate performance of the active servo control loop while concurrently calibrating the inactive servo control loop.

In one embodiment, the slope of the ramp when ramping the disturbance 30 such as shown in FIG. 4B may be calibrated to achieve a desired performance. For example, increasing the slope of the ramp so as to reach the nominal amplitude faster may, in one embodiment, decrease the calibration time needed to calibrate the servo control loop, but may lead to a decrease in throughput of the active channel due to an increase in read errors or write aborts. In one embodiment, the slope of the ramp may be adapted over time based on the performance of the active channel, such as by decreasing the slope when the read errors or write aborts of the active channel increase (e.g., when experiencing a higher level of external vibration).

In one embodiment, the slope of the ramped disturbance 70 may be adjusted based on whether the active channel is executing a write operation or a read command. FIG. 4C shows an embodiment wherein the slope of the ramp may be decreased when the active channel is executing a write command in order to reduce the chance the write operation will be aborted due to an off track condition. That is, in one embodiment write aborts may be considered more detrimental than read errors, and so the slope of the ramped disturbance 70 may be decreased when the active channel is executing a write command.

In the embodiments described above, the data storage device comprises two coarse actuators (e.g., two VCMs configured to rotate respective actuator arms about a common or independent pivot). In other embodiments, the data storage device may comprise more than two coarse actuators and more than two corresponding fine actuators, wherein each fine actuator may be calibrated by ramping a disturbance as described above in order to attenuate a transient affecting the active servo control loops. In another embodiment, each servo control loop may comprise more than one fine actuator (e.g., a triple stage actuator), wherein each fine actuator may be calibrated by injecting a ramped disturbance into the respective servo control loop either serially or concurrently.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
 a plurality of disk surfaces;
 a first plurality of heads actuated over a first subset of the disk surfaces by a first servo control loop comprising a first coarse actuator and a first fine actuator;
 a second plurality of heads actuated over a second subset of the disk surfaces by a second servo control loop comprising a second coarse actuator and a second fine actuator; and
 control circuitry configured to:
  receive a plurality of access commands, wherein each access command is associated with one of the heads;
  while executing a first access command using the first servo control loop:
   ramp a disturbance while injecting the disturbance into the second servo control loop; and
   calibrate the second fine actuator based on the disturbance.

2. The data storage device as recited in claim 1, wherein the disturbance consists of a sinusoid.

3. The data storage device as recited in claim 2, wherein the control circuitry is further configured to ramp the disturbance by ramping an amplitude of the sinusoid.

4. The data storage device as recited in claim 1, wherein ramping the disturbance attenuates a transient in the first servo control loop while executing the first access command.

5. The data storage device as recited in claim 1, wherein the control circuitry is further configured to calibrate a slope of the ramp.

6. The data storage device as recited in claim 1, wherein the control circuitry is further configured to adapt a slope of the ramp based on a performance of the first servo control loop.

7. The data storage device as recited in claim 1, wherein the control circuitry is further configured to:
- ramp the disturbance at a first rate when the first access command is a read command; and
- ramp the disturbance at a second rate slower than the first rate when the first access command is a write command.

8. A data storage device comprising:
- a plurality of disk surfaces;
- a first plurality of heads actuated over a first subset of the disk surfaces by a first servo control loop comprising a first coarse actuator and a first fine actuator;
- a second plurality of heads actuated over a second subset of the disk surfaces by a second servo control loop comprising a second coarse actuator and a second fine actuator; and
- control circuitry configured to:
  - receive a plurality of access commands, wherein each access command is associated with one of the heads;
  - while executing a first access command using the first servo control loop:
    - modify a disturbance while injecting the disturbance into the second servo control loop, wherein modifying the disturbance attenuates a transient in the first servo control loop; and
    - calibrate the second fine actuator based on the disturbance.

9. The data storage device as recited in claim 8, wherein the control circuitry is further configured to modify the disturbance by ramping the disturbance.

10. The data storage device as recited in claim 9, wherein the disturbance consists of a sinusoid.

11. The data storage device as recited in claim 10, wherein the control circuitry is further configured to ramp the disturbance by ramping an amplitude of the sinusoid.

12. The data storage device as recited in claim 9, wherein the control circuitry is further configured to calibrate a slope of the ramp.

13. The data storage device as recited in claim 9, wherein the control circuitry is further configured to adapt a slope of the ramp based on a performance of the first servo control loop.

14. The data storage device as recited in claim 9, wherein the control circuitry is further configured to:
- ramp the disturbance at a first rate when the first access command is a read command; and
- ramp the disturbance at a second rate slower than the first rate when the first access command is a write command.

15. A data storage device comprising:
- a plurality of disk surfaces;
- a first plurality of heads actuated over a first subset of the disk surfaces by a first servo control loop comprising a first coarse actuator and a first fine actuator;
- a second plurality of heads actuated over a second subset of the disk surfaces by a second servo control loop comprising a second coarse actuator and a second fine actuator; and
- a means for receiving a plurality of access commands, wherein each access command is associated with one of the heads;
- while executing a first access command using the first servo control loop:
  - a means for ramping a disturbance while injecting the disturbance into the second servo control loop; and
  - a means for calibrating the second fine actuator based on the disturbance.

16. The data storage device as recited in claim 15, wherein the disturbance consists of a sinusoid.

17. The data storage device as recited in claim 16, wherein the means for ramping ramps an amplitude of the sinusoid.

18. The data storage device as recited in claim 15, wherein ramping the disturbance attenuates a transient in the first servo control loop while executing the first access command.

19. The data storage device as recited in claim 15, further comprising a means for adjusting a slope of the ramp.

20. The data storage device as recited in claim 15, wherein the means for ramping:
- ramps the disturbance at a first rate when the first access command is a read command; and
- ramps the disturbance at a second rate slower than the first rate when the first access command is a write command.

* * * * *